(12) United States Patent
Pang et al.

(10) Patent No.: US 12,030,821 B1
(45) Date of Patent: Jul. 9, 2024

(54) CONCRETE INTERFACE AGENT

(71) Applicant: Qingdao University of Technology, Qingdao (CN)

(72) Inventors: Bo Pang, Qingdao (CN); Zuquan Jin, Qingdao (CN); Guoqing Geng, Singapore (SG); Yunsheng Zhang, Qingdao (CN); Cheng Liu, Qingdao (CN); Yidong Chen, Qingdao (CN); Dafu Wang, Qingdao (CN); Rusheng Qian, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 18/522,139

(22) Filed: Nov. 28, 2023

(30) Foreign Application Priority Data

Jun. 15, 2023 (CN) .......................... 202310711835.7

(51) Int. Cl.
*C04B 41/49* (2006.01)
*C04B 41/46* (2006.01)
*C04B 41/50* (2006.01)

(52) U.S. Cl.
CPC ........ *C04B 41/4922* (2013.01); *C04B 41/463* (2013.01); *C04B 41/5035* (2013.01)

(58) Field of Classification Search
CPC .............. C04B 41/5035; C04B 41/463; C04B 41/4922
See application file for complete search history.

(56) References Cited

FOREIGN PATENT DOCUMENTS

| | | | |
|---|---|---|---|
| CN | 106699006 A | * | 5/2017 |
| CN | 109913006 A | | 6/2019 |
| CN | 111333365 A | | 6/2020 |
| CN | 114163159 A | | 3/2022 |
| CN | 114478064 A | | 5/2022 |
| CN | 114736534 A | | 7/2022 |
| KR | 20040058539 A | * | 7/2004 |
| KR | 101901198 B1 | | 9/2018 |

OTHER PUBLICATIONS

Chen Xu, Li Shaochun, Gao Yan, Geng Yongjuan, Gao Song, Influence of TEOS-Isobutyl Triethoxysilane Composite Emulsion on Chloride Resistance of Concrete, Paint & Coatings Industry, 09, Sep. 1, 2016.

* cited by examiner

*Primary Examiner* — Alex B Efta

(57) ABSTRACT

A concrete interface agent relates to the technical field of concrete surface protection, an ingredient of the concrete interface agent comprises 55 to 100 parts by weight of a nano-calcium salt solution and a nano-$SiO_2$ precursor, 0.1 to 0.4 parts by weight of a surfactant, 30 to 60 parts by weight of a silane coupling agent and 10 to 40 parts by weight of a polydimethylsilane, an ingredient of the nano-calcium salt solution comprises 2 to 5 parts by weight of a calcium hydroxide, 2 to 5 parts by weight of an acid catalyst and 200 to 500 parts by weight of an alcohol-based organic solvent, which can form a coating layer with higher hydrophobic angle on the concrete surface, reduce the water absorption of the concrete, and is not easy to crack after drying, which has more protective effect and longer service life than the existing TEOS interface agent.

5 Claims, 7 Drawing Sheets

Before treatment

After treatment

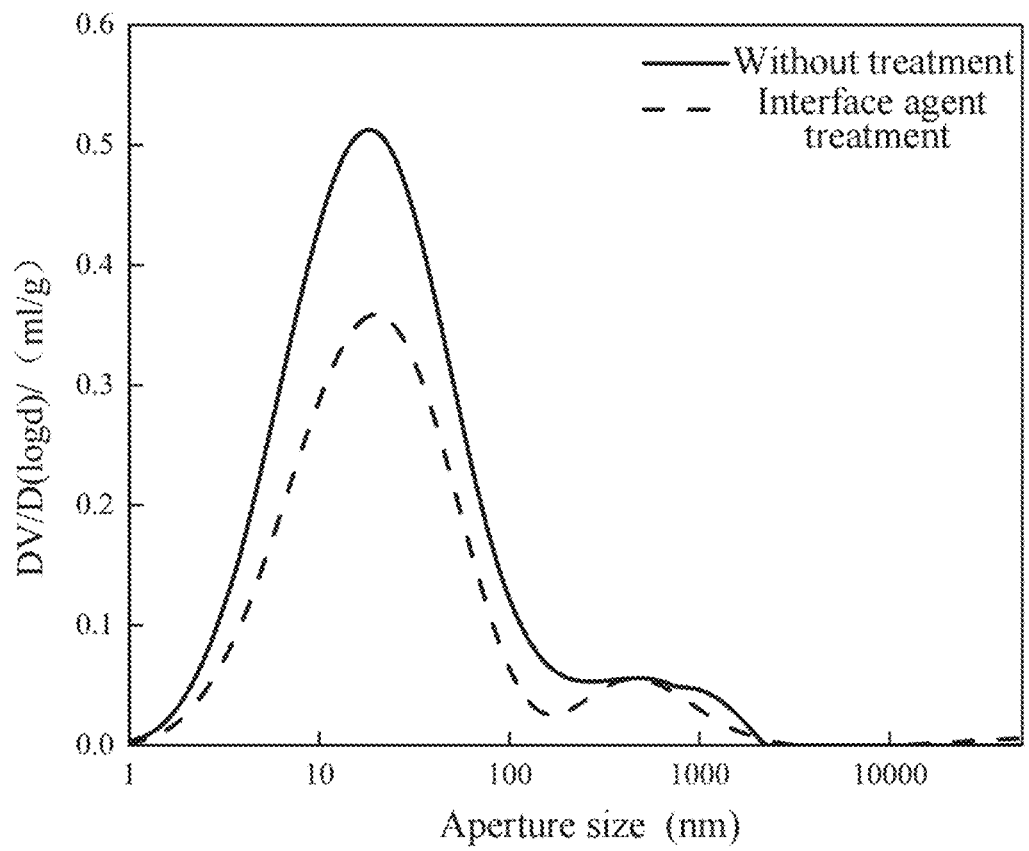
FIG. 8
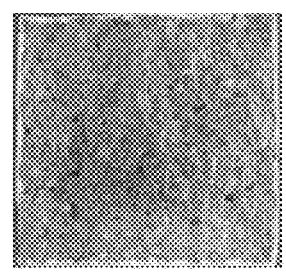 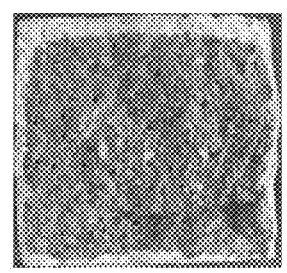
FIG. 9A  FIG. 9B

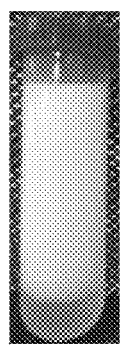 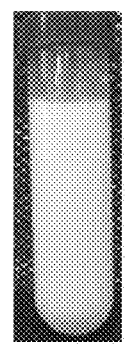
(a)          (b)
FIG. 10A         FIG. 10B
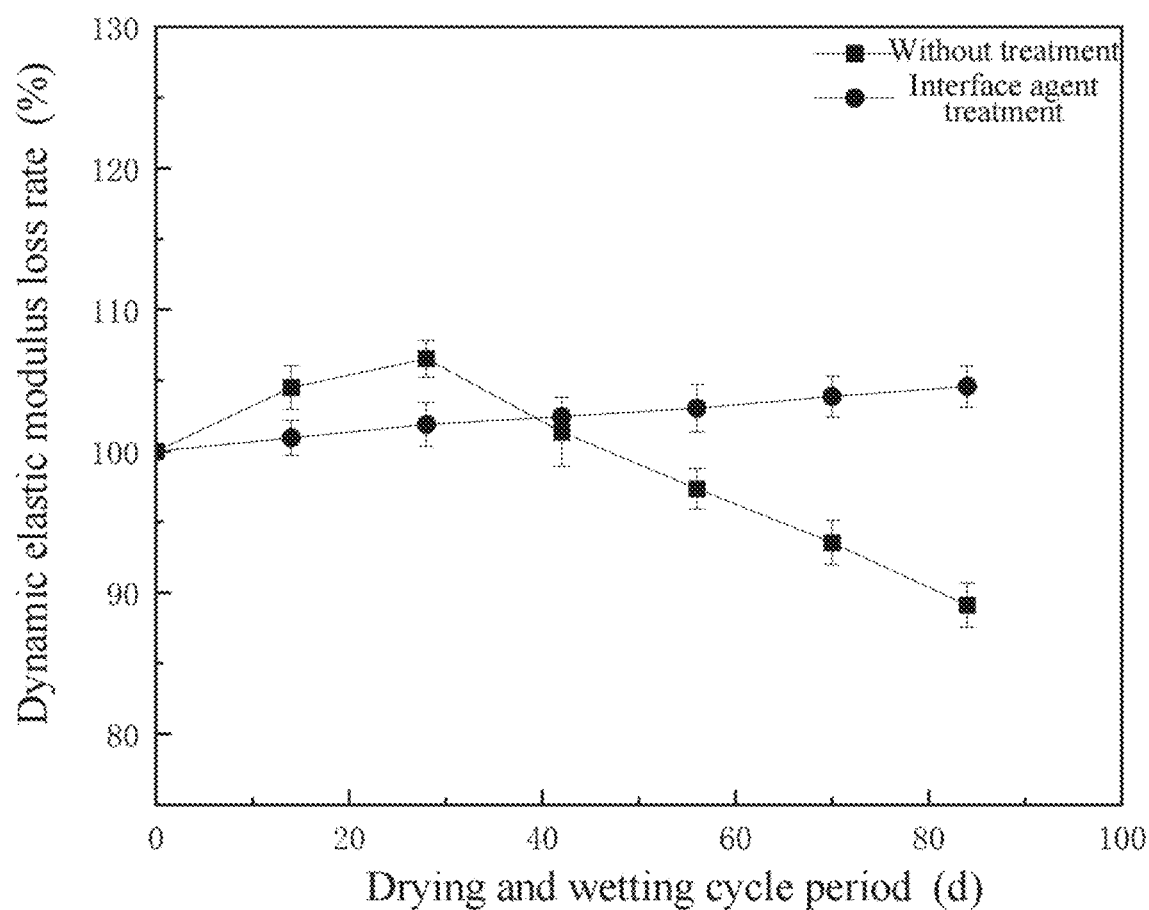
FIG. 11

CONCRETE INTERFACE AGENT

TECHNICAL FIELD

The present invention relates to the technical field of concrete surface protection, and in particular to a concrete interface agent.

BACKGROUND

With the continuous development of the economy and the national investment in infrastructure, the volume of buildings, roads and bridges is increasing day by day. However, the concrete structure is a structure with water-proof defects, and the water is easy to penetrate into the interior of the concrete. During the service process, it will continuously produce cracking, spalling and other degradation problems, and high maintenance costs need to be invested to ensure the normal use during service.

The concrete surface treatment is an important way to improve the durability of concrete. The TEOS is one kind of the alkoxysilane, in the structure of TEOS, the chemical bond between the alkoxy and the silicon is very weak, which makes the TEOS easily react with water to produce polysilicic acid, ethanol and so on. In the past, the TEOS is commonly used as a binder for siliceous substrates to repair the ancient buildings. With the deepening of the research on the reactivity of TEOS with different carriers, the researchers have found that the TEOS has great advantages in the concrete surface treatment. Due to the TEOS has a very small molecular weight and polarity, so that it has good permeability, in the high alkaline conditions inside the concrete, it will hydrolyze to produce the polysilicic acid, a part of it will condense to produce the nano-silica, and a part of it will perform pozzolanic effect with the calcium hydroxide to produce the C—S—H gel, which increases the density of the concrete and reduces the harmfulness of the alkali-aggregate reaction.

At present, the TEOS used for concrete surface treatment has the following problems to be solved:

The nano-silica gel produced by the dehydration and condensation of the TEOS is prone to drying and cracking, which may lead to the re-generation of cracks in the pores that have already been sealed, thereby affecting the sealing effect, and resulting in a short service life of the protective layer, requiring frequent repair of the protective layer, and consuming a lot of manpower and material resources for the maintenance of the protective layer, with a high use cost.

Therefore, it is necessary to provide an improved technical solution for the TEOS.

SUMMARY

It is an object of the present invention to provide a concrete interface agent with the advantages of good waterproof effect, less cracking and the like, which can effectively improve the service life of the concrete and solve the problem of poor performance when the existing TEOS is used for concrete surface treatment.

In order to achieve the above-mentioned object, the present invention provides the following technical solutions:

A concrete interface agent, wherein an ingredient of the concrete interface agent comprises 55 to 100 parts by weight of a nano-calcium salt solution and a nano-$SiO_2$ precursor, 0.1 to 0.4 parts by weight of a surfactant, 30 to 60 parts by weight of a silane coupling agent and 10 to 40 parts by weight of a polydimethylsilane, an ingredient of the nano-calcium salt solution comprises 2 to 5 parts by weight of a calcium hydroxide, 2 to 5 parts by weight of an acid catalyst and 200 to 500 parts by weight of an alcohol-based organic solvent.

Advantageous Effects (1) According to the interface agent provided in the present invention, the catalyst in which can promote the cross-linking reaction between the silane coupling agent and the polydimethylsilane, the polydimethylsilane acts as a soft segment between the Si—O segments, so as to avoid the formation of the fragile gel fragments in the polymer during the drying stage, thereby forming a secondary capillary network in the concrete, so that the protective effect is invalid. According to the interface agent in the present invention, the nano-oxalic acid in which can enhance the crack resistance of the dry gel, and the electrical property thereof is similar to that of the calcium carbonate, which can enhance the penetration depth of the interface agent in the concrete.

(2) The concrete interface agent of the present invention not only has the effect of improving the hydrophobicity of concrete, but also has the effect of improving the pore structure of the concrete surface, so as to improve the freeze-thaw resistance and the corrosion resistance, which can effectively improve the service life of the concrete.

(3) The interface agent prepared in the present invention comprises a certain proportion of the silane coupling agent, and the comprised groups, such as amino group, hydroxyl group and the like, can produce a cross-linking effect with common coating materials such as epoxy, polyurethane and the like, without affecting the adhesion effect between the coating layer and the treated concrete interface.

(4) The materials and treatment methods used in the present invention are green and safe, do not produce environmentally harmful substances, and meet the needs of sustainable development.

BRIEF DESCRIPTION OF THE DRAWINGS

FIG. 8 is the changes of the concrete surface aperture distribution after the treatment of the concrete interface agent in Example 1 of the present invention, wherein the control group is the untreated concrete.

FIG. 9A and FIG. 9B are the test results of the penetration depth in Example 1 and Comparative example 4 of the present invention, wherein FIG. 9A is the image of Comparative example 4 and FIG. 9B is the image of Example 1.

FIG. 10A and FIG. 10B is the lotion dispersion results of Example 1 and Comparative example 5, wherein FIG. 10A is the image of Comparative example 5 and FIG. 10B is the image of Example 1.

FIG. 11 is the comparison of the sulfate erosion between the interface agent used in Example 1 and the untreated control group.

DETAILED DESCRIPTION OF EMBODIMENTS

Figure 1:
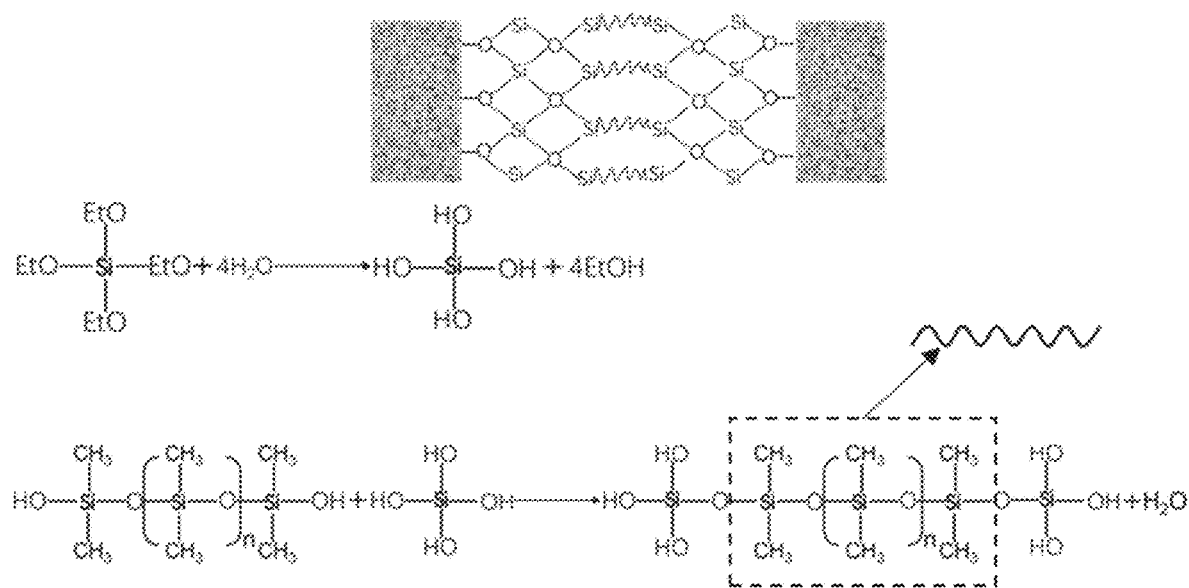
FIG. 1 is a schematic diagram of the cross-linking reaction between the silane coupling agent and the polydimethylsilane to produce a soft segment in the present invention.

The long-term exposure of the concrete structure to the environment inevitably leads to degradation, resulting in loose and porous surfaces. In this case, the hydrophobic treatment of the concrete surface with the silane only does not change the essence of loose and porous surfaces of the concrete, the role of gaseous water still exists, so that there is still a serious deterioration problem on the concrete surface. Only using impregnating agents, such as sodium silicate and the like, cannot solve the problem, the concrete surface is still hydrophilic, and the concrete will continue to deteriorate in the long run.

The present invention aims at the problems existing in the hydrophobic treatment of the concrete surface with the silane at present, and provides a concrete interface agent, based on the sol gel method and the hydrolysis condensation effect, the nano-$SiO_2$ precursor is used as an interface strengthening agent, the polydimethylsilane provides hydrophobicity and prevents dry gel cracking, and can simultaneously improve the durability and hydrophobicity of the concrete.

The present invention provides a concrete interface agent, which comprises 55 to 100 parts by weight of a nano-calcium salt solution and a nano-$SiO_2$ precursor, 0.1 to 0.4 parts by weight of a surfactant, 30 to 60 parts by weight of a silane coupling agent and 10 to 40 parts by weight of a polydimethylsilane, an ingredient of the nano-calcium salt solution comprises 2 to 5 parts by weight of a calcium hydroxide, 2 to 5 parts by weight of an acid catalyst and 200 to 500 parts by weight of an alcohol-based organic solvent.

In the preferred example of the present invention, the nano-calcium salt solution is a reaction product of an alcoholic solution of the calcium hydroxide and an alcoholic solution of the acid catalyst; the alcoholic solution of the calcium hydroxide is a filtrate obtained by filtering the calcium hydroxide dispersed in a first part alcohol-based organic solvent; the alcoholic solution of the acid catalyst is a solution obtained by dispersing the acid catalyst into a second part alcohol-based organic solvent; the total amount of the first part alcohol-based organic solvent and the second part alcohol-based organic solvent is 200-500 parts by weight.

The nano-$SiO_2$ precursor comprises a TEOS and/or a methyl silicate.

The alcohol-based organic solvent comprises at least one of a methanol, an ethanol and an isopropanol.

The acid catalyst comprises at least one of an oxalic acid, a tartaric acid and a hydrochloric acid.

The surfactant comprises at least one of a polyethylene glycol, a sodium dodecyl sulfonate and a sodium dodecyl sulfate.

The silane coupling agent comprises at least one of a KH550, a KH560 and a KH570.

The present invention also provides a preparation method of the above-mentioned concrete interface agent, and the preparation method of the example of the present invention comprises the following steps 1 to 4, in the step 1, weighing the calcium hydroxide and the alcohol-based organic solvent proportionally and placing in a stirring device for stirring, and then filtering to obtain the alcoholic solution of the calcium hydroxide;

in the step 2, weighing the acid catalyst and the alcohol-based organic solvent proportionally and placing in the stirring device for stirring, so as to obtain the alcoholic solution of the acid catalyst; in the step 3, mixing two alcoholic solutions obtained in the steps 1 to 2 to obtain the nano-calcium salt solution;

in the step 4, weighing the nano-$SiO_2$ precursor, the polydimethylsilane, the silane coupling agent and the surfactant proportionally and adding into the nano-calcium salt solution, after fully stirring, ageing at 20±5° C. and humidity of 30% to 60% for at least 1 day, so as to obtain the concrete interface agent.

In the steps 1 to 2, the stirring temperature is 20° C. to 25° C., and the stirring time is not less than 2 h.

In the step 3, the mixing is performed through stirring, the stirring rate is 10000 rpm to 15000 rpm, and the stirring time is 0.5 h to 1 h.

In the preferred example of the present invention, in the step 4, the stirring rate is 250 rpm to 300 rpm, and the stirring time is 5 h to 7 h.

Below is a detailed explanation of the concrete interface agent and the preparation method thereof of the present invention through the specific examples.

In the following examples and Comparative examples:

According to JGJ/T 70-2009 *Standard for Test Methods for Basic Performance of Building Mortar*, the prepared concrete interface agent is tested. Before treatment, the concrete surface should be kept dry, the concrete surface should be cleaned simply and the dust should be removed. The concrete interface agent is sprayed on the concrete surface once every 1 h, twice in total. The dosage of interface agent per square meter of the concrete surface is 300 g.

The water absorption of the concrete before treatment is 7.51%.

Example 1

The present example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 10 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to JGJ/T 70-2009 *Standard for Test Methods for Basic Performance of Building Mortar*, the prepared concrete interface agent of the present example is tested. After 6 days of the spraying of the concrete interface agent in Example 1 of the present invention, the concrete contact angle is 140° and the water absorption is decreased from 7.51% to 0.30%.

Example 2

The present example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 20 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete curing admixture prepared in present example is tested, the concrete contact angle is 145° and the water absorption is decreased from 7.51% to 0.25%.

Example 3

The present example provides a concrete interface agent, the concrete interface agent is prepared by the following method comprises the following steps 1 to 4.

In the step 1, weighing 3 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 10000 rpm, so as to obtain the nano-calcium oxalate solution.

In the step 4, adding 100 parts by weight of the TEOS, 10 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete curing admixture prepared in present example is tested, the concrete contact angle is 135° and the water absorption is decreased from 7.51% to 0.41%.

Example 4

The present example provides a concrete interface agent, the concrete interface agent is prepared by the following method comprises the following steps 1 to 4.

In the step 1, weighing 2 parts by weight of the calcium hydroxide and 100 parts by weight of the ethanol proportionally and placing in a magnetic stirring device, stirring at 20° C. for 2.5 h, and then filtering to obtain the alcoholic solution of the calcium hydroxide.

In the step 2, weighing 4 parts by weight of the oxalic acid and 100 parts by weight of the ethanol proportionally and placing in a magnetic stirring device, stirring at 20° C. for 2.5 h, so as to obtain the alcoholic solution of the oxalic acid.

In the step 3, mixing the above-mentioned two alcoholic solutions obtained in the steps 1 to 2, and stirring for 1 h in an adjustable high-speed homogenizer with the stirring rate at 10000 rpm, so as to obtain the nano-calcium oxalate solution.

In the step 4, adding 80 parts by weight of the methyl silicate, 10 parts by weight of the polydimethylsilane, 40 parts by weight of the KH550, and 0.1 parts by weight of the sodium dodecyl sulfonate into the nano-calcium oxalate solution, and the magnetic stirring device is used for fully stirring (the stirring rate is 250 rpm, the stirring time is 8 h), and the stirred solution is aged for 1 day, so as to obtain the concrete interface agent.

According to the performance testing standards in Example 1, the performance of the concrete curing admixture prepared in present example is tested, the concrete contact angle is 120° and the water absorption is decreased from 7.51% to 1.21%.

Example 5

The present example provides a concrete interface agent, the concrete interface agent is prepared by the following method comprises the following steps 1 to 4.

In the step 1, weighing 2 parts by weight of the calcium hydroxide and 150 parts by weight of the isopropanol proportionally and placing in a magnetic stirring device, stirring at 23° C. for 2 h, and then filtering to obtain the alcoholic solution of the calcium hydroxide.

In the step 2, weighing 5 parts by weight of the tartaric acid and 150 parts by weight of the isopropanol proportionally and placing in a magnetic stirring device, stirring at 23° C. for 2 h, so as to obtain the alcoholic solution of the tartaric acid.

In the step 3, mixing the above-mentioned two alcoholic solutions obtained in the steps 1 to 2, and stirring for 0.5 h in an adjustable high-speed homogenizer with the stirring rate at 15000 rpm, so as to obtain the nano-calcium tartrate solution.

In the step 4, adding 100 parts by weight of the TEOS, 40 parts by weight of the polydimethylsilane, 60 parts by weight of the KH570, and 0.4 parts by weight of the sodium dodecyl sulfate into the nano-calcium tartrate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete curing admixture prepared in present example is tested, the concrete contact angle is 123° and the water absorption is decreased from 7.51% to 0.83%.

Example 6

The present example provides a concrete interface agent, the concrete interface agent is prepared by the following method comprises the following steps 1 to 4.

In the step 1, weighing 5 parts by weight of the calcium hydroxide and 50 parts by weight of the isopropanol proportionally and placing in a magnetic stirring device, stirring at 25° C. for 2 h, and then filtering to obtain the alcoholic solution of the calcium hydroxide.

In the step 2, weighing 5 parts by weight of the hydrochloric acid and 50 parts by weight of the isopropanol proportionally and placing in a magnetic stirring device, stirring at 25° C. for 2 h, so as to obtain the alcoholic solution of the hydrochloric acid.

In the step 3, mixing the above-mentioned two alcoholic solutions obtained in the steps 1 to 2, and stirring for 0.5 h in an adjustable high-speed homogenizer with the stirring rate at 12000 rpm, so as to obtain the nano-calcium chloride solution.

In the step 4, adding 55 parts by weight of the TEOS, 20 parts by weight of the polydimethylsilane, 50 parts by weight of the KH560, and 0.2 parts by weight of the sodium dodecyl sulfonate into the nano-calcium chloride solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete curing admixture prepared in present example is tested, the concrete contact angle is 130° and the water absorption is decreased from 7.51% to 0.74%.

Comparative Example 1

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 50 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete interface agent prepared in present comparative example is tested, the concrete contact angle is 95°, and the water absorption is decreased from 7.51% to 3.43%.

Comparative Example 2

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 10 parts by weight of the polydimethylsilane, 5 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete interface agent prepared in present comparative example is tested, the concrete contact angle is 100°, and the water absorption is decreased from 7.51% to 2.95%.

Comparative Example 3

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 10 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 10 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

The prepared concrete interface agent cannot be stored for a long time and exhibits layer phenomenon after aging for 1 day.

Comparative Example 4

The present comparative example provides a concrete interface agent, the concrete interface agent is prepared by the following method comprises the following steps 1 to 4.

In the step 1, weighing 2 parts by weight of the calcium hydroxide and 200 parts by weight of the ethanol proportionally and placing in a magnetic stirring device, stirring at 25° C. for 2 h, and then filtering to obtain the alcoholic solution of the calcium hydroxide.

In the step 2, weighing 10 parts by weight of the oxalic acid and 200 parts by weight of the ethanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 10 parts by weight of the polydimethylsilane, 30 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

The concrete interface agent is used for splitting and dripping experiments, and compare it with Example 1. As shown in FIG. 9A and FIG. 9B, the penetration depth of the concrete interface agent prepared by using the isopropanol as the solvent is better than the ethanol as the solvent.

Comparative Example 5

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 10 parts by weight of the tartaric acid and 200 parts by weight of the isopropanol proportionally and placing in a magnetic stirring device, stirring at 25° C. for 2 h, so as to obtain the alcoholic solution of the tartaric acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium tartrate solution.

In the step 4, adding 100 parts by weight of the TEOS, 10 parts by weight of the polydimethylsilane, 30 parts by weight of the KH550, and 0.2 parts by weight of the polyethylene glycol into the nano-calcium tartrate solution, and the magnetic stirring device is used for fully stirring (the stirring rate is 300 rpm, the stirring time is 7 h), and the stirred solution is aged for 1 day, so as to obtain the concrete interface agent.

The dispersivity of the prepared concrete interface agent is poor, as shown in FIG. 10A and FIG. 10B, the obvious layering is occurred after placement.

Comparative Example 6

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 10 parts by weight of the hydrochloric acid and 200 parts by weight of the isopropanol proportionally and placing in a magnetic stirring device, stirring at 25° C. for 2 h, so as to obtain the alcoholic solution of the hydrochloric acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium chloride solution.

In the step 4, adding 100 parts by weight of the TEOS, 10 parts by weight of the polydimethylsilane, 30 parts by weight of the KH550, and 0.2 parts by weight of the polyethylene glycol into the nano-calcium chloride solution, and the magnetic stirring device is used for fully stirring (the stirring rate is 300 rpm, the stirring time is 7 h), and the stirred solution is aged for 1 day, so as to obtain the concrete interface agent.

The prepared concrete interface agent is gelated after 2 days and cannot be stored for a long time.

Comparative Example 7

The present comparative example provides a concrete interface agent, instead of the oxalic acid in Example 1, an equal amount of deionized water is used, and the other preparation processes are the same as Example 1.

The preparation method of the concrete interface agent is the same as that of Example 1, the stirring time required to form the lotion of the concrete interface agent is greatly extended, which takes 2-3 days. In addition, the dry gel formed after the interface agent is dried appears a small amount of cracking.

According to the performance testing standards in Example 1, the performance of the concrete interface agent prepared in present comparative example is tested, the concrete contact angle is 113°, and the water absorption is decreased from 7.51% to 2.32%.

Comparative Example 8

The present comparative example provides a concrete interface agent, the concrete interface agent is prepared by the following method comprises the following steps 1 to 4.

In the step 1, weighing 2 parts by weight of the calcium hydroxide and 200 parts by weight of the isopropanol proportionally and placing in a magnetic stirring device, stirring at 25° C. for 2 h, and then filtering to obtain the alcoholic solution of the calcium hydroxide.

In the step 2, weighing 3 parts by weight of the oxalic acid and 200 parts by weight of the isopropanol proportionally and placing in a magnetic stirring device, stirring at 25° C. for 2 h, so as to obtain the alcoholic solution of the oxalic acid.

In the step 3, mixing the above-mentioned two alcoholic solutions obtained in the steps 1 to 2, and stirring for 0.5 h in an adjustable high-speed homogenizer with the stirring rate at 12500 rpm, so as to obtain the nano-calcium oxalate solution.

In the step 4, adding 100 parts by weight of the TEOS, 10 parts by weight of the polydimethylsilane, 70 parts by weight of the KH550, and 0.2 parts by weight of the polyethylene glycol into the nano-calcium oxalate solution, and the magnetic stirring device is used for fully stirring (the stirring rate is 300 rpm, the stirring time is 7 h), and the stirred solution is aged for 1 day, so as to obtain the concrete interface agent.

According to the performance testing standards in Example 1, the performance of the concrete interface agent prepared in present comparative example is tested, the concrete contact angle is 110°, and the water absorption is decreased from 7.51% to 2.63%.

Comparative Example 9

The present comparative example provides a concrete interface agent, which is obtained by dispersing 20 parts by weight of the TEOS into 80 parts by weight of the ethanol.

Figure 2:
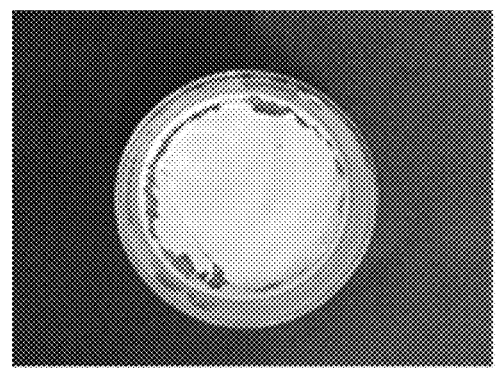
FIG. 2 is the appearance of the silicon gel produced after drying the concrete interface agent in Example 1 of the present invention.

The dry gel formed after the interface agent is dried appears a large amount of cracking, as shown in FIG. 2, without forming the soft segment, resulting in poor crack resistance.

According to the performance testing standards in Example 1, the performance of the concrete interface agent prepared in present comparative example is tested, the concrete contact angle is 95°, and the water absorption is decreased from 7.51% to 2.43%.

Data Analysis:

The data of Examples 1-6 and Comparative examples 1-9 is analyzed as follows.

① After the surface treatment of the concrete by using the concrete interface agent prepared in Examples 1-6, the contact angles of the concrete surface are above 120°, with a maximum of 145°, and the minimum of the water absorption can be reduced to 0.25%. It has a good waterproof effect, which is significantly better than the existing TEOS interface agent.

Figure 3:
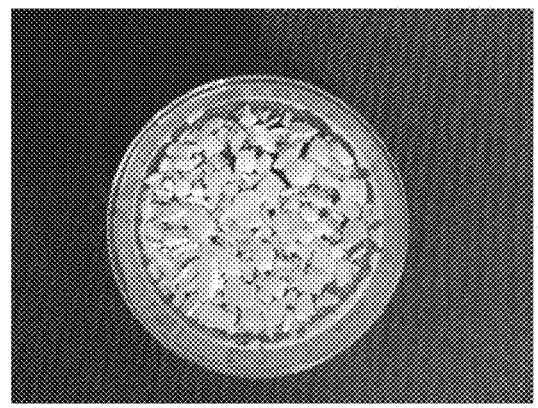
FIG. 3 is the silicon gel produced after the solidification of the TEOS interface agent prepared in Comparative example 9, without producing the soft segment.
Figure 4:
FIG. 4 is the structural change of the concrete surface before and after the treatment with the concrete interface agent in Example 1 of the present invention.
Figure 4:
Figure 4:

② As shown in FIGS. 2-3, the silicon gel formed by the interface agent prepared in Example 1 after drying does not show obvious cracking, while the TEOS interface agent prepared in Comparative example 9 shows a large amount of cracking after drying. The crack resistance of the concrete interface agent prepared by the present invention is obviously better than that of the TEOS interface agent, and also better than that of the concrete interface agent in Comparative example 7, which indicates that the crack resistance of the interface agent dry gel is significantly enhanced after adding the nano-calcium salt.

Figure 5:
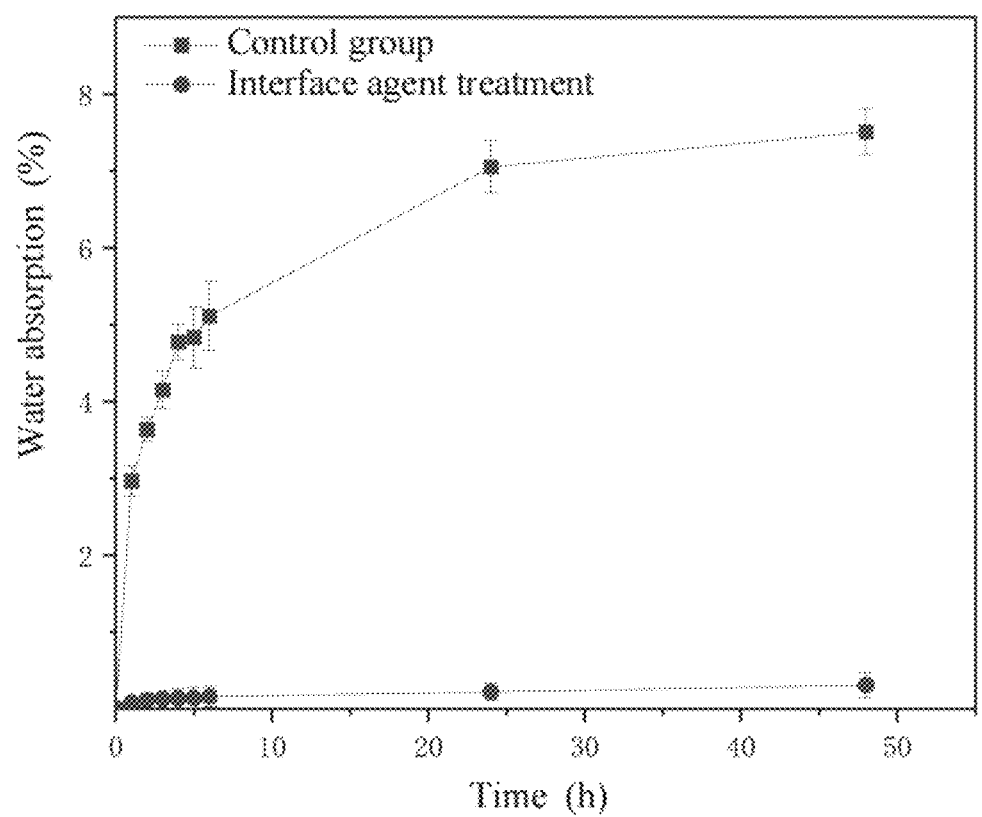
FIG. 5 is the changes of the concrete surface water absorption after the treatment of the concrete interface agent in Example 1 of the present invention, wherein the control group is the untreated concrete.

③ As shown in FIG. 5, after treating the concrete surface with the concrete interface agent prepared in Example 1, the water absorption of the concrete surface is still remained extremely low after 45 h, while the water absorption of the concrete without the treatment of the concrete interface agent is exceeded 5% after 10 h. This concrete interface agent has a significant waterproof effect.

Figure 6:
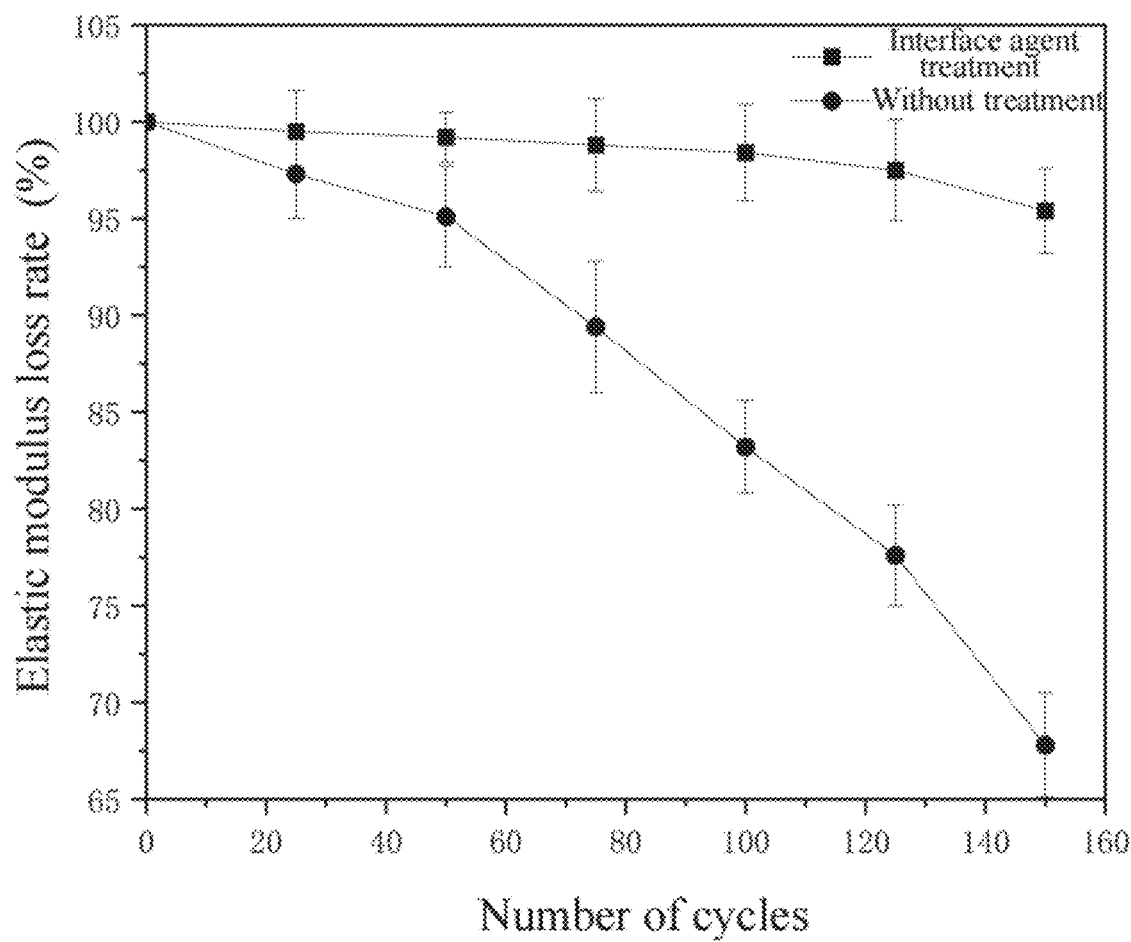
FIG. 6 is the changes of the concrete surface frost resistant after the treatment of the concrete interface agent in Example 1 of the present invention, wherein the control group is the untreated concrete.

④ As shown in FIG. 6, in the freeze-thaw cycle test, after being treated with the concrete interface agent prepared in Example 1, the elastic modulus loss rate of the concrete is less than 5% at 150 freeze-thaw cycles, while the concrete elastic modulus of the concrete without the interface agent treatment is rapidly decreased with the increase of the freeze-thaw cycles, and the elastic modulus loss rate at 150 freeze-thaw cycles has been exceeded 30%. This concrete interface agent can significantly improve the frost resistant of the concrete.

Figure 7:
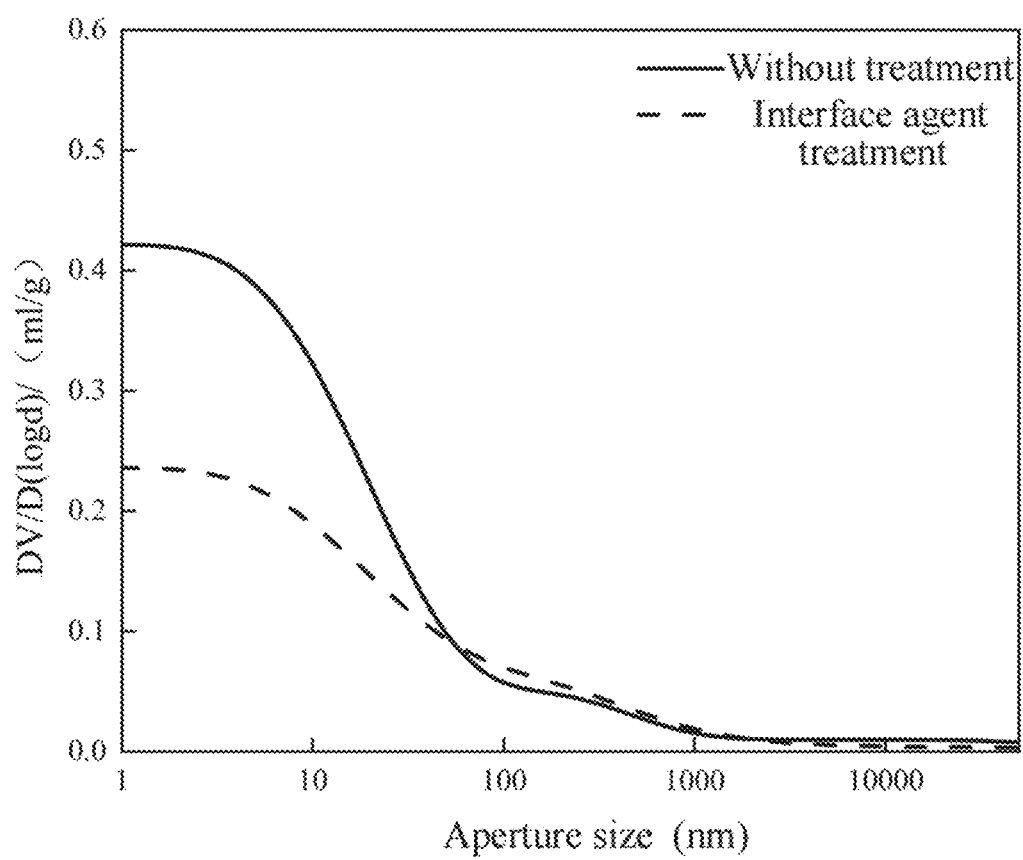
FIG. 7 is the changes of the concrete surface accumulated aperture after the treatment of the concrete interface agent in Example 1 of the present invention, wherein the control group is the untreated concrete.

⑤ After treating the concrete surface with the concrete interface agent prepared in Example 1, the accumulated aperture of the concrete surface is measured, as shown in FIG. 7, the pore size of the concrete surface with a diameter≥1 nm is significantly reduced compared to the concrete without the interface agent treatment; Analyzing the aperture distribution of the concrete surface, as shown in FIG. 8, after the treatment of the concrete interface agent prepared in Example 1, the pores of the concrete surface with a pore size of 1-100 nm are significantly reduced compared to concrete without the interface agent treatment; It can be seen that the concrete interface agent prepared by the present invention can effectively fill the micropores of the concrete surface, thereby improving impermeability, frost resistant and other properties.

⑥ As shown in FIG. 11, after treating the concrete surface with the concrete interface agent prepared in Example 1, the sulfate attack test is performed. Compared to the concrete without the interface agent treatment, after 30 days of drying and wetting cycle, the dynamic elastic modulus of the concrete without the interface agent treatment is began to rapidly decrease and decreased to below 90% of the initial value after 80 days of cycling. The dynamic elastic modulus of the concrete treated with this concrete interface agent is remained stable and slightly increased during the drying and wetting cycle process, and this concrete interface agent can effectively resist the sulfate attack.

In Summary:

The interface agent provided in the present invention not only has the effect of improving the durability of the concrete, but also has the effect of improving the hydrophobic property of the concrete surface and effectively improving the service life of the concrete structure. For the loose and porous problem caused by the long-term degradation of the surface, the TEOS in the interface agent can play the role of binding the matrix and filling the pores; The pdms and the silane coupling agent in the hydrophobic agent can self-cross-link under the action of the acidic catalyst, so as to form a hydrophobic film on the pore wall and the concrete surface.

According to the interface agent provided in the present invention, the nano-calcium salt in which can enhance the crack resistance of the TEOS dry gel, and can also increase the permeability of the interface agent by using the feature that the electrical property thereof is similar to that of calcium carbonate.

The interface agent of the present invention is used in an amount of at least 300 g per square meter of the concrete surface during use.

The invention claimed is:

1. A concrete interface agent, wherein, the concrete interface agent comprises 55 to 100 parts by weight of a calcium salt solution and a $SiO_2$ precursor, 0.1 to 0.4 parts by weight of a surfactant, 30 to 60 parts by weight of a silane coupling agent and 10 to 40 parts by weight of a polydimethylsilane,
   calcium salt solution comprises 2 to 5 parts by weight of a calcium hydroxide, 2 to 5 parts by weight of an acid catalyst and 200 to 500 parts by weight of an alcohol-based organic solvent.

2. The concrete interface agent according to claim 1, wherein, the calcium salt solution is a reaction product of an alcoholic solution of the calcium hydroxide and an alcoholic solution of the acid catalyst;
   the alcoholic solution of the calcium hydroxide is a filtrate obtained by filtering the calcium hydroxide dispersed in a first part alcohol-based organic solvent;
   the alcoholic solution of the acid catalyst is a solution obtained by dispersing the acid catalyst into a second part alcohol-based organic solvent;
   the total amount of the first part alcohol-based organic solvent and the second part alcohol-based organic solvent is 200-500 parts by weight.

3. The concrete interface agent according to claim 1, characterized in that, the $SiO_2$ precursor comprises a methyl silicate.

4. The concrete interface agent according to claim 1, wherein, the alcohol-based organic solvent comprises at least one of a methanol, an ethanol and an isopropanol, and the acid catalyst comprises at least one of an oxalic acid, a tartaric acid and a hydrochloric acid.

5. The concrete interface agent according to claim 1, wherein, the surfactant comprises at least one of a polyethylene glycol, a sodium dodecyl sulfonate and a sodium dodecyl sulfate.

* * * * *